United States Patent
Mann et al.

(10) Patent No.: US 9,422,439 B2
(45) Date of Patent: Aug. 23, 2016

(54) INK SET

(75) Inventors: Joshua A. Mann, San Diego, CA (US); Ali Emamjomeh, San Diego, CA (US); Ronald A. Askeland, San Diego, CA (US); Zeying Ma, San Diego, CA (US); George Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 14/373,990

(22) PCT Filed: Feb. 17, 2012

(86) PCT No.: PCT/US2012/025625
§ 371 (c)(1),
(2), (4) Date: Jul. 23, 2014

(87) PCT Pub. No.: WO2013/122601
PCT Pub. Date: Aug. 22, 2013

(65) Prior Publication Data
US 2014/0362137 A1    Dec. 11, 2014

(51) Int. Cl.
| | | |
|---|---|---|
| B32B 3/02 | (2006.01) |
| C09D 11/36 | (2014.01) |
| C09D 11/322 | (2014.01) |
| C09D 11/40 | (2014.01) |
| C09D 11/54 | (2014.01) |
| C08K 3/28 | (2006.01) |
| C08K 5/053 | (2006.01) |
| C08K 5/06 | (2006.01) |
| C08K 5/3415 | (2006.01) |

(52) U.S. Cl.
CPC . *C09D 11/36* (2013.01); *C08K 3/28* (2013.01); *C08K 5/053* (2013.01); *C08K 5/06* (2013.01); *C08K 5/3415* (2013.01); *C09D 11/322* (2013.01); *C09D 11/40* (2013.01); *C09D 11/54* (2013.01); *C08K 2003/287* (2013.01)

(58) Field of Classification Search
CPC ........ C09D 11/30; C09D 11/36; C09D 11/54; C09D 11/322; C08K 3/28; Y10T 428/24802
See application file for complete search history.

(56) References Cited

U.S. PATENT DOCUMENTS

| | | |
|---|---|---|
| 6,528,148 B2 | 3/2003 | Niu et al. |
| 6,715,866 B2 | 4/2004 | Kasperchik et al. |
| 7,157,504 B2 | 1/2007 | Ma et al. |
| 8,007,548 B2 | 8/2011 | McGorrin |
| 2007/0076075 A1 | 4/2007 | Schmid et al. |
| 2007/0216742 A1* | 9/2007 | Sarkisian ............... C09D 11/54 347/100 |
| 2007/0225401 A1* | 9/2007 | Sarkisian ............... C09D 11/54 523/160 |
| 2009/0233068 A1 | 9/2009 | Irita |
| 2009/0295892 A1 | 12/2009 | Akiyama et al. |
| 2010/0231671 A1 | 9/2010 | Anton et al. |
| 2011/0303113 A1 | 12/2011 | Sarkisian et al. |

FOREIGN PATENT DOCUMENTS

| | | |
|---|---|---|
| EP | 0534634 | 3/1993 |
| EP | 0723569 A1 | 7/1996 |
| WO | 2011099977 | 8/2011 |

OTHER PUBLICATIONS

International Search Report dated Oct. 29, 2012 for International application No. PCT/US2012/025625 filed Feb. 17, 2012, Applicant Hewlett-Packard Development Company, L.P. et al.

* cited by examiner

*Primary Examiner* — Elizabeth Mulvaney
(74) *Attorney, Agent, or Firm* — Thorpe, North & Western L.L.P.

(57) ABSTRACT

The present disclosure provides ink sets and related methods. An ink set can comprise an ink including an ink colorant and an ink vehicle, the ink devoid of metal salt; a treatment fluid including a latex, the treatment fluid devoid of thickener and colorant; and a fixer fluid including a precipitating agent, the fixer fluid devoid of colorant.

20 Claims, No Drawings

INK SET

BACKGROUND

There are several reasons that inkjet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to inkjet ink chemistry, the majority of commercial inkjet inks are water-based. Thus, their constituents are generally water-soluble, as in the case with many dyes, or water dispersible, as in the case with pigments. Furthermore, inkjet inks typically have low viscosity to accommodate high frequency jetting and firing chamber refill processes common to thermal inkjet architecture.

DETAILED DESCRIPTION

It has been recognized that separating specific compositional elements into a three pen ink set can provide improved performance and printing characteristics over a wide variety of applications. In accordance with this, compositions and methods described herein can include an ink set comprising an ink, a treatment fluid, and a fixer fluid. It is noted that when discussing the present compositions and methods, each of these discussions can be considered applicable to each of these embodiments, whether or not they are explicitly discussed in the context of that embodiment. Thus, for example, in discussing a fixer fluid used in an ink set, such a fixer fluid can also be used in a method of producing images, and vice versa.

Generally, inkjet inks can have a variety of compositional elements including colorants, binders, salts, precipitating agents, organic solvents, thickeners, etc. However, it has been recognized that selective removal of various ink compositional elements from an ink with subsequent incorporation into separate inkjet pens can provide an ink set having exceptional printing performance characteristics including coalescence, gloss, bleed control, and optical density.

With the above in mind, an ink set for inkjet printing can comprise an ink including an ink colorant and an ink vehicle, the ink devoid of metal salt; a treatment fluid including a latex, the treatment fluid devoid of thickener and colorant; and a fixer fluid including a precipitating agent, the fixer fluid devoid of colorant.

As mentioned, the ink can comprise an ink colorant in an ink vehicle, and is devoid of metal salt. As used herein, "devoid of" when referring to the metal salt refers to a composition that does not include any added amount of the metal salt, but may contain residual amounts, such as in the form of impurities. For example, metal salts are often inherently present in residual or trace amounts in water or other vehicle components, and those concentrations can be present provided they do not unfavorably interact with colorant or other ingredients. Metal salts, for example, can include those described herein including those described as precipitating agents of the fixer fluid. In one example, such metal salt impurities can be present in trace amounts, and in one aspect, in an amount of less than 0.1 wt % based on the total wt % of the composition, even though the composition is described as being "devoid of" metal salts. In other words, "devoid of metal salt" means devoid of added metal salt and allows for trace amounts or impurities inherently present in certain ingredients.

As used herein, "liquid vehicle" or "ink vehicle" refers to the liquid fluid in which colorant is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc., provided there are no metal salts present in the liquid vehicle. Additionally, the term "aqueous liquid vehicle" or "aqueous vehicle" refers to a liquid vehicle including water as a solvent. In one aspect, water can comprise a majority of the liquid vehicle.

Further, as mentioned, the inks of the present disclosure will also include an ink colorant, which can be a dye and/or pigment. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. As used herein, "devoid of" when used in conjunction with "colorant" include pigments and/or dyes as discussed herein.

In one specific example, the inks of the present disclosure can also include a pigment dispersed by an acrylic dispersant. The acrylic dispersant can include acrylic polymers having hydrophilic monomers including acid monomers, and hydrophobic monomers. Hydrophobic monomers that can be polymerized in the acrylic dispersant include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the acrylic dispersant at from about 0.1 wt % to about 30 wt %. Acidic monomers that can be used in the acrylic dispersant include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the acrylic dispersants can include reactive surfactants such as functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAX-EMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

Turning now to the treatment fluid, this composition comprises a latex and is devoid of thickener and colorant. As used herein, "devoid of" when used in conjunction with "thickener" include those thickeners described for use in the fixer fluid as discussed herein. As used herein, "latex" or "latex resin" refers to discrete polymer particles dispersed in a treatment fluid. In one example, the latex can be selected from the group consisting acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, and mixtures thereof. In another example, the latex in the treatment fluid can be an acrylic latex.

In some other examples, the latex resin can be a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin can be a polymer or a copolymer selected from the group consisting of acrylic polymers, vinyl-acrylic copolymers and acrylic-polyurethane copolymers. The latex resin may have a weight average molecular weight ($M_w$) of about 5,000 to about 500,000. The latex resin can have a weight average molecular weight ($M_w$) ranging from about 100,000 to about 500,000, without limitation. In some other examples, the latex resin has a weight average molecular weight of about 150,000 to 300,000.

The average particle diameter of the latex resin particles can be from about 10 nm to about 1 μm; in some other examples, from about 10 nm to about 500 nm; and, in yet other examples, from about 50 nm to about 250 nm. The particle size distribution of the latex is not particularly limited, and either latex having a broad particle size distribution or latex having a mono-dispersed particle size distribution may be used. It is also possible to use two or more kinds of latex particles each having a mono-dispersed particle size distribution in combination.

The latex resin components may include, but are not limited to latex resins sold under the name Hycar® or Vycar® (from Lubrizol Advanced Materials Inc.); Rhoplex® (from Rohm & Hass company); Neocar® (from Dow Chemical Comp); Aquacer® (from BYK Inc) or Lucidene® (from Rohm & Haas company).

With respect to the fixer fluid, this composition can include a precipitating agent, and is devoid of colorant. In one example, the precipitating agent can be a metal salt. In one aspect, the metal salt can include a polyvalent metal cation. In another aspect, the metal salt can include a polyvalent metal cation selected from the group of $Ca^{2+}$, $Mg^{2+}$, or $Zn^{2+}$, and mixtures thereof. In one example, the polyvalent metal cation can be $Ca^{2+}$. Additionally, such salts can include anions as well. Examples of anions include $Cl^-$, $I^-$, $Br^-$, $NO^{-3}$ or $RCOO^-$ (where R is H or any hydrocarbon chain, e.g., from C1 to C8, branched or straight chained). The polyvalent metal salt component can be a divalent or a higher polyvalent metal salt cation and anion. In some examples, the polyvalent metal salt component can be soluble in water. Non-limiting examples of polyvalent metal cations include divalent metal cations, such as $Ca^{2+}$, $Cu^{2+}$, $Ni^{2+}$, $Mg^{2+}$, $Zn^{2+}$ and $Ba^{2+}$ or combination thereof; trivalent metallic ions, such as $Al^{3+}$, $Fe^{3+}$ and $Cr^{3+}$ or combination thereof. In one aspect, the polyvalent metal salt anion can be a chloride ($Cl^-$) or acetate ($CH_3COO^-$). In some examples, the polyvalent metal salt can be composed of divalent or polyvalent metallic ions and of nitrate or carboxylate ions. The carboxylate ions are derived from a saturated aliphatic monocarboxylic acid having 1 to 6 carbon atoms or a carbocyclic monocarboxylic acid having 7 to 11 carbon atoms. Non-limiting examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid. In some examples, the polyvalent metal salt can be selected from the group consisting of calcium chloride, calcium nitrate, magnesium nitrate, magnesium acetate or zinc acetate. In some other examples, the polyvalent metal salt can be calcium chloride or calcium nitrate ($CaCl_2$ or $Ca(NO_3)_2$). In yet some other examples, the polyvalent metal salt can be calcium chloride ($CaCl_2$). In yet some other examples, the polyvalent metal salt can be anhydrous.

Additionally, the fixer fluid can include a thickener. Generally, the thickener can be selected from the group consisting of synthetic thickeners, natural derivative thickeners, synthetic polymer-type thickener, and mixtures thereof. In one aspect, the thickener can be a polyethoxylated thickener. Non-limiting examples of synthetic thickeners include polyvinyl alcohol, polyacrylamide, polyacrylic acids and alkali soluble emulsion (such as acrylic and styrene maleic emulsion). Non-limiting examples of natural derivative thickeners include cellulose ethers (such as sodium carboxymethyl cellulose (CMC), methylcellulose (MC), hydroxyethyl cellulose (HEC), and ethylhydroxyethylcellulose (EHEC)), polysaccharides and/or protineacious thickeners. As mentioned, the thickener can also be a synthetic polymer-type thickener. Such synthetic polymer-type thickener can be prepared by a polymerization reaction of a methacrylic acid, a methacrylic ester, and/or a saturated aliphatic carboxylic acid vinyl ester. Examples of methacrylic esters include methyl methacrylate, ethyl methacrylate, propyl methacrylate, isopropyl methacrylate, butyl methacrylate, n-amyl methacrylate, sec-amyl methacrylate, hexyl methacrylate, lauryl methacrylate, stearyl methacrylate, ethylhexyl methacrylate, crotyl methacrylate, cinnamyl methacrylate, oleyl methacrylate, ricinoleyl methacrylate, hydroxyethyl methacrylate, or hydroxypropyl methacrylate. Examples of aliphatic carboxylic acid vinyl esters include vinyl acetate, vinyl propionate, vinyl butylate, ter-vinyl butylate, vinyl caprylate, vinyl stearate, vinyl laurate, or vinyl oleate.

In some examples, the thickener can be an acryl emulsion copolymer viscosity modifier prepared by emulsion-polymerizing acrylic acid or methacrylic acid. Alkyl acrylate or alkyl methacrylate, hydrophobic group-containing ethoxylated ester of acrylic acid or methacrylic acid, and polyethylenically unsaturated monomer are also suitable for use herein. In some other examples, copolymers, which are a reaction product of various monomers including methacrylic acid, ethyl acrylate, copolymerizable ethylenically unsaturated monomer, and/or polyethylenically unsaturated monomers are also suitable. In another example the thickener can be a copolymer which is a reaction product between two or more monomers comprising methacrylic acid, ethyl acrylate, isocyanate, ethylenically unsaturated monomer, monoethylenically unsaturated monoisocyanate or polyhydric alcohol. The thickener can be methacrylic acid, a methacrylic or an acrylic ester of an alcohol, a vinyl ester, or a surface-active unsaturated ester.

Additional examples of a thickener include alkali-swellable acrylic thickeners, such as Acrysol®Ase-60 (available from Rohm & Haas), Acrysol®Ase-75, Rheolate® 450 and Rheolate® 420, and associative thickeners, such as Elementis Rheolate®255 (available from Rheox International Inc). Other examples of thickener include copolymer prepared by condensing a polyhydric alcohol with a monoethylenically unsaturated monoisocyanate such as, for example, Rheolate® 210, Rheolate® 216 and Rheolate® 212 (available from Rheox International Inc). Other commercially available thickeners may be found under the trade names Optiflo®, Drewthix®, Ucar®, Polyphobe®, Rheotech®, Texipol®, Coapur®, etc. In some examples, the thickener can be Rheolate® 212.

The inkjet ink compositions of the present disclosure can also be suitable for use on many types of substrates of recording media, including but not limited, cellulose-based paper media. In one example, the media can be gloss media. As used herein, "gloss" refers generally to the amount of light reflected by an object's surface, such as, e.g., an inkjet media surface. Gloss can be quantified and measured relative to specific specular angles from an object surface. The specular angle is the angle equal to but opposite the angle of incidence. This specular light is responsible for the highlights visible on shiny materials. When quantifying gloss, it can be measured at angles of 20°, 60°, and 85° off of the normal. Gloss measurements are indicated by gloss units in relation to the angle used for measurement. In one specific example, as used herein, "60° gloss" is the gloss of an image measured by using "BYK-Gardner micro-TRI-gloss" meter with incident angle set at 60°. In one example, the ink set can provide for a 60° gloss of at least 15 when printed on gloss media. In one aspect, the ink set can provide for a 60° gloss of at least 25 when printed on gloss media.

It is also noted that the ink set of the present disclosure, when printed as prescribed herein on media, can provide excellent print qualities. For example, as used herein, "optical density durability" or "ΔOD" refers to the change in optical density of the sample after it is rubbed with damp cloth under a controlled weight. The sample is rubbed one week after it is printed. In one example, the ink set can provide for an optical density durability of 0.5 or less. In one aspect, the ink set can provide for an optical density durability of 0.1 or less. The optical density is measured using an X-rite 500 series Spectrodensitometer. The rub is performed with a Taber® 5750 Linear Abraser.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like. In one example, the ink vehicle can be predominantly water and can be referred to as an aqueous liquid vehicle.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

In addition to the ink sets described herein, the present disclosure provides for methods relating thereto. Generally, a method of producing images on media can comprise inkjetting an ink, a treatment fluid, and a fixer fluid on the media forming a mixed fluid and precipitating an ink colorant of the ink with a precipitating agent of the fixer fluid in the mixed fluid. The method can further include reacting a thickener of the fixer fluid with a latex of the treatment fluid to increase the viscosity of the mixed fluid.

In one specific aspect, such a method can include where the ink colorant is a pigment, the latex is an acrylic latex, the precipitating agent includes a multivalent metal cation, the thickener is a polyethoxylated thickener, and the media is a gloss media.

Regarding the present method steps, such steps can be performed in a number of sequences and are not intended to be limited to the order written. For example, the treatment fluid can be inkjetted before the ink. In another example, the fixer fluid can be inkjetted before the ink. Additionally, it is noted that any and all combinations of such steps or individual step may be performed sequentially or simultaneously. For example, inkjetting an ink, a treatment fluid, and a fixer fluid on the media may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present ink compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present ink set compositions and methods have been described above with particularity, the following examples provide further detail in connection with what are presently deemed to be the acceptable embodiments.

Example 1

Ink Set Preparation

A black ink, treatment fluid, and fixer fluid were prepared by mixing the compositional elements and associated amounts set forth in Table 1.

TABLE 1

| Compositional Elements | Black Ink (wt %) | Treatment Fluid (wt %) | Fixer Fluid (wt %) |
| --- | --- | --- | --- |
| Black Pigment | 3 | 0 | 0 |
| Hycar ® 26-1265 Latex (available from Lubrizol) | 0 | 8 | 0 |
| Calcium Nitrate Tetrahydrate | 0 | 0 | 3 |
| 2-Pyrrolidone | 9 | 0 | 0 |
| 1,6-Hexanediol | 0 | 4 | 3 |
| Tripropylene glycol | 0 | 4 | 3 |
| 2-Methyl-1,3-propanediol | 0 | 4 | 3 |
| Chemguard S550 (fluorosurfactant available from Chemguard Specialty Chemicals) | 0 | 0.1 | 0.1 |
| Liponic ® EG-1 (polyethylene glycol ether from Lipo Chemicals) | 0 | 1 | 1 |
| Tego ®Wet 510 (surfactant from Evonik Tego Chemie GmbH) | 0.4 | 0 | 0 |
| Proxel ™ GXL (preservative from Arch Chemicals) | 0.1 | 0.1 | 0.1 |
| Kordek ™ MLX (preservative from Rohm and Haas) | 0.14 | 0 | 0 |

TABLE 1-continued

| Compositional Elements | Black Ink (wt %) | Treatment Fluid (wt %) | Fixer Fluid (wt %) |
| --- | --- | --- | --- |
| Optiflo ® TVS-VF (thickener from Southern Clay Products) | 0 | 0 | 0.3 |
| Crodafos ™ N3 Acid (antikogation agent from Croda) | 0.5 | 0 | 0 |
| Water | balance | balance | balance |

Example 2

Ink Set Characterization

The Ink of Example 1 was printed at 11.4 gsm, the treatment fluid at 3.3 gsm, and the fixer fluid at 2.5 gsm on sterling ultra gloss media (glossy cellulosic paper based). The resulting images were measured for bleed, coalescence, 60° gloss, and optical density durability (measured as the change in optical density after being rubbed with a weighted wet cloth, one week after printing ($\Delta OD$)). The printed images had no issues with bleed and provided acceptable coalescence. Additionally, the images provided a gloss of 23 and an optical density durability of −0.1.

Example 3

Comparative Ink with Binder

A comparative ink was formulated according to the Black Ink of Example 1, except the comparative ink contained 0.5 wt % latex binder. The comparative ink was printed at 11.4 gsm on sterling ultragloss media and tested in accordance with the tests of Example 2. The comparative ink did not provide acceptable bleed or coalescence. Additionally, while the printed images provided a gloss of 45, the printed images had an unacceptable optical density durability of 0.6.

Example 4

Comparative Ink with Binder Printed with Fixer

The comparative ink of Example 3 was printed with the Fixer Fluid of Example 1 with the resulting printed images tested according to Example 2. The comparative ink was printed at 11.4 gsm and the fixer fluid was printed at 2 gsm on sterling ultra gloss media. The resulting images of the comparative ink and fixer fluid provided acceptable bleed or coalescence. However, the printed images provided an unacceptable gloss of 14 and had an unacceptable optical density durability of 1.

Example 5

Ink Set without Thickener

The ink set of Example 1 was formulated according to the Black Ink, Treatment Fluid, and Fixer Fluid of Example 1, with the exception that the thickener was not added to the Fixer Fluid. The Ink Set was printed at 11.4 gsm, the treatment fluid was printed at 3.3 gsm, and the fixer fluid was printed at 2.5 gsm on sterling ultra gloss media with the resulting printed images tested according to Example 2. The resulting images of the Ink Set had no issues with bleed or coalescence. Additionally, the printed images provided a gloss of 17 and had an optical density durability of 0.3.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An ink set, comprising:
   an ink including an ink colorant and an ink vehicle, the ink devoid of metal salt;
   a treatment fluid including a latex, the treatment fluid devoid of thickener and colorant; and
   a fixer fluid including a precipitating agent, the fixer fluid devoid of colorant.

2. The ink set of claim 1, wherein the ink colorant is a pigment.

3. The ink set of claim 1, wherein the latex in the treatment fluid is selected from the group of acrylic polymers or copolymers, vinyl acetate polymers or copolymers, polyester polymers or copolymers, vinylidene chloride polymers or copolymers, butadiene polymers or copolymers, styrene-butadiene copolymers, acrylonitrile-butadiene copolymers, and mixtures thereof.

4. The ink set of claim 1, wherein the latex is an acrylic latex.

5. The ink set of claim 1, wherein the precipitating agent is a metal salt.

6. The ink set of claim 5, wherein the metal salt includes a polyvalent metal cation selected from the group consisting of $Ca^{2+}$, $Mg^{2+}$, or $Zn^{2+}$, and mixtures thereof.

7. The ink set of claim 1, wherein the fixer fluid includes a thickener selected from the group of synthetic thickeners, natural derivative thickeners, synthetic polymer-type thickeners, and mixtures thereof.

8. The ink set of claim 7, wherein the thickener is a polyethoxylated thickener.

9. The ink set of claim 1, wherein the ink set provides for a 60° gloss of at least 15 and an optical density durability of 0.5 or less when printed on gloss media.

10. A method of producing images on media, comprising:
    separately inkjetting an ink, a treatment fluid, and a fixer fluid on the media forming a mixed fluid on the media; and
    precipitating an ink colorant of the ink with a precipitating agent of the fixer fluid in the mixed fluid.

11. The method of claim 10, further comprising reacting a thickener of the fixer fluid with a latex of the treatment fluid to increase the viscosity of the mixed fluid.

12. The method of claim 11, wherein the colorant is a pigment, the latex is an acrylic latex, the precipitating agent includes a multivalent metal cation, the thickener is a polyethoxylated thickener, and the media is a gloss media.

13. The method of claim 10, wherein the treatment fluid is inkjetted before the ink.

14. The method of claim 10, wherein the fixer fluid is inkjetted before the ink.

15. The method of claim 10, wherein the images provide for a 60° gloss of at least 15 and an optical density durability of 0.5 or less when printed on gloss media.

16. An ink set, comprising:
    an ink including an ink colorant and an ink vehicle, the ink devoid of metal salt;
    a treatment fluid including a latex, the treatment fluid devoid of thickener and colorant; and
    a fixer fluid including a precipitating agent, the fixer fluid devoid of colorant, wherein the fixer fluid includes a thickener selected from the group of synthetic thickeners, natural derivative thickeners, synthetic polymer-type thickeners, and mixtures thereof.

17. The ink set of claim 16, wherein the thickener is a polyethoxylated thickener.

18. The ink set of claim 16, wherein the ink colorant is a pigment, and wherein the latex in the treatment fluid is selected from the group of acrylic polymers or copolymers, vinyl acetate polymers or copolymers, polyester polymers or copolymers, vinylidene chloride polymers or copolymers, butadiene polymers or copolymers, styrene-butadiene copolymers, acrylonitrile-butadiene copolymers, and mixtures thereof.

19. The ink set of claim 16, wherein the precipitating agent is a metal salt and includes a polyvalent metal cation selected from the group consisting of $Ca^{2+}$, $Mg^{2+}$, or $Zn^{2+}$, and mixtures thereof.

20. The ink set of claim 16, wherein the ink set provides for a 60° gloss of at least 15 and an optical density durability of 0.5 or less when printed on gloss media.

* * * * *